(12) United States Patent  
Galstian et al.

(10) Patent No.: US 8,072,574 B2
(45) Date of Patent: Dec. 6, 2011

(54) TUNABLE LIQUID LENS WITH REDUCED ABERRATION

(75) Inventors: Tigran Galstian, Ste-Foy (CA); Karen Asatryan, Québec (CA); Vladimir Presniakov, Quebec (CA); Armen Zohrabyan, Quebec (CA); Amir Tork, Quebec (CA); Aram Bagramyan, Québec (CA)

(73) Assignee: LensVector, Mountain View, CA (US)

( * ) Notice: Subject to any disclaimer, the term of this patent is extended or adjusted under 35 U.S.C. 154(b) by 368 days.

(21) Appl. No.: 12/393,021

(22) Filed: Feb. 25, 2009

(65) Prior Publication Data

US 2009/0213321 A1    Aug. 27, 2009

Related U.S. Application Data

(60) Provisional application No. 61/031,101, filed on Feb. 25, 2008.

(51) Int. Cl.
*G02F 1/13* (2006.01)
*H04N 5/232* (2006.01)
*G02B 13/18* (2006.01)

(52) U.S. Cl. ............... 349/200; 348/349; 396/89

(58) Field of Classification Search .......... 349/33, 349/129, 187, 191, 200; 359/9, 14, 721; 396/85, 89; 348/345, 348, E5.042
See application file for complete search history.

(56) References Cited

U.S. PATENT DOCUMENTS

| 4,190,330 | A  | * | 2/1980  | Berreman ........... 349/200 |
| 6,859,333 | B1 | * | 2/2005  | Ren et al. .......... 359/721 |
| 6,864,951 | B1 | * | 3/2005  | Ren et al. .......... 349/200 |
| 7,218,375 | B2 | * | 5/2007  | Galstian et al. ..... 349/200 |
| 7,394,498 | B2 | * | 7/2008  | Takaoka ............. 348/363 |
| 7,724,347 | B2 | * | 5/2010  | Tseng et al. ........ 349/200 |
| 7,859,640 | B2 | * | 12/2010 | Galstian et al. ..... 349/200 |

* cited by examiner

*Primary Examiner* — Akm Ullah
(74) *Attorney, Agent, or Firm* — Anglehart et al.

(57) ABSTRACT

A tunable optical imaging system uses a fixed lens and a tunable liquid crystal lens that is operated only outside of an operational range of high aberration. A voltage range applied to change the optical power of the liquid crystal lens is limited to a continuous tunable range of low aberration. The relative positioning between the lens and a corresponding photodetector, and the relative lens powers of a fixed lens and the tunable lens, may be selected to compensate for any optical power offsets resulting from the limitation of the voltage range of the tunable lens. The lens may be operated in either positive tunability or negative tunability mode.

24 Claims, 6 Drawing Sheets

OBJECT NEAR 10

OBJECT MID-RANGE 11

OBJECT FAR 12

TUNABLE LIQUID LENS WITH REDUCED ABERRATION

TECHNICAL FIELD

The present invention relates generally to the field of electrically controllable optical devices and, more particularly, to liquid crystal lenses having an optical power that is adjustable through a continuous range.

BACKGROUND OF THE INVENTION

Tunable liquid crystal optical devices are known in the art, as for example in WO/2007/098602. These optical devices are flat structures having a liquid crystal layer in which the liquid crystal changes its refractive index as a function of the electric field. By applying a spatially modulated electric field, there is provided a spatially modulated index of refraction with the appropriate geometry for the optical device, for example a lens. Such tunable lenses offer the advantage of being thin and compact, a factor that is important in certain applications, such as in the case of mobile telephone cameras. The performance of such lenses can be measured by two important parameters, namely the tunable diopter range and the level of aberration.

The nature of the variability of index of refraction in response to an electric field depends on the properties of the liquid crystal device. In some devices, a non-linear effect can be observed as the liquid crystal molecules begin to align (molecular group alignment being referred to as director alignment) with the electric field from an initial orientation perpendicular to the electric field. When the electric field is essentially homogenous, the non-linearity means that the change in voltage per unit of change in optical property varies over the range of optical property change of the device, but otherwise, this does not impede operation.

It has been discovered that the optical properties of many tunable liquid crystal optical devices are not consistent over their tunable range. Aberration and scattering properties have been observed to increase as the electric field begins to change the orientation of the liquid crystal molecules, with both scattering and aberration becoming less prevalent as orientation increases along the lines of the electric field. Scattering appears as a cloudiness or murkiness in the liquid crystal layer. In the case of a lens, aberrations induce image distortions. It has been found in the case of some lenses, aberration and scattering drop significantly after peak optical power of the tunable liquid crystal lens. This appears to be the case since peak optical power happens while regions of the lens are still in conditions of initial change of orientation of the liquid crystal molecules. Thus, use of peak optical power of a tunable liquid crystal lens to enjoy maximum power and also the largest range of tunability may be less desirable than using a somewhat reduced range that avoids higher levels of aberration and scattering of the lens. In accordance with the present invention a tunable liquid crystal lens operates within a suitable portion of the tunable range having better optical properties. In an electrically tuned liquid crystal optical device, tunable optical parameter level (optical power, steering angle, etc.) control is provided by controlling the electric field. Magnetic field control is also known. Moreover, the electric field is typically proportional to an applied voltage at electrodes, however, the field level may also depend on a frequency of the applied electrical signal.

SUMMARY OF THE INVENTION

It has been discovered that the optical properties of many tunable liquid crystal optical devices are not consistent over their tunable range. Aberration and scattering properties have been observed to increase as the electric field begins to change the orientation of the liquid crystal molecules, with both scattering and aberration becoming less prevalent as orientation increases along the lines of the electric field. Scattering appears as a cloudiness or murkiness in the liquid crystal layer. In the case of a lens, aberrations induce image distortions. It has been found in the case of some lenses, aberration and scattering drop significantly after peak optical power of the tunable liquid crystal lens. This appears to be the case due to case since peak optical power happens while regions of the lens are still in conditions of initial change of orientation of the liquid crystal molecules. Thus, use of peak optical power of a tunable liquid crystal lens to enjoy maximum power and also the largest range of tunability may be less desirable than using a somewhat reduced range that avoids higher levels of aberration and scattering of the lens. In accordance with the present invention a tunable liquid crystal lens operates within a suitable portion of the tunable range having better optical properties. In an electrically tuned liquid crystal optical device, the field level controlled in the electric field. Magnetic field control is also known. Moreover, the electric field is typically proportional to applied voltage at electrodes, however, the field level may also depend on frequency of applied electrical signal.

In some embodiments, the invention provides a tunable lens system that combines a liquid crystal layer having an electric field source with one or more fixed lenses. The electric field source provides a variable, spatially non-uniform electric field across the liquid crystal layer to provide a tunable range of optical power. The liquid crystal layer, under the effect of the electric field, forms a tunable liquid crystal lens. This liquid crystal lens has an optical power that undergoes a change in a first direction from an initial power at zero field level to a peak optical power at a second field level and in a second direction, opposite the first direction, from the peak optical power to a non-zero end optical power different from the initial power at a desired maximum field level. The liquid crystal lens has a low-aberration and/or low-scatter, continuous, non-zero, variable optical power tunable range at field levels from a third field level at or above the second field level up to the desired maximum field level. The fixed lenses cooperate with the liquid crystal lens at non-zero optical power to focus an image onto the image sensor with an infinity focus near one limit of the tunable range.

In some embodiments, the invention provides a method of controlling a tunable optical device having a liquid crystal layer and a variable, spatially non-uniform electric field applied across the liquid crystal layer to provide a tunable range of an optical property. The method involves measuring or detecting at least one of aberration and scattering caused by the liquid crystal layer under conditions of lower or moderate electric fields to determine an optical quality of the device as a function of electric field. A suitable range of operation for the electric field is determined that avoids a range at which the optical quality is less desirable. The electric field is generated in accordance with a desired optical value for the device within the suitable range of operation for the electric field.

In some embodiments, there is provided a tunable optical device (such as a lens, beam steering device, etc.) having a liquid crystal layer and a variable, spatially non-uniform electric field applied across the liquid crystal layer to provide a tunable range of an optical property. The tunable optical device has an electric field controller setting an electric field control signal in response to a desired optical value signal, and the electric field controller has an offset value restricting a range of operation of the tunable range to reduce an effect of at least one of aberration or scattering caused by the liquid crystal layer under conditions of lower or moderate electric fields.

BRIEF DESCRIPTION OF THE DRAWINGS

Further features and advantages of the present invention will become apparent from the following detailed description, taken in combination with the appended drawings, in which.

DETAILED DESCRIPTION OF THE PREFERRED EMBODIMENT

Figure 1A:
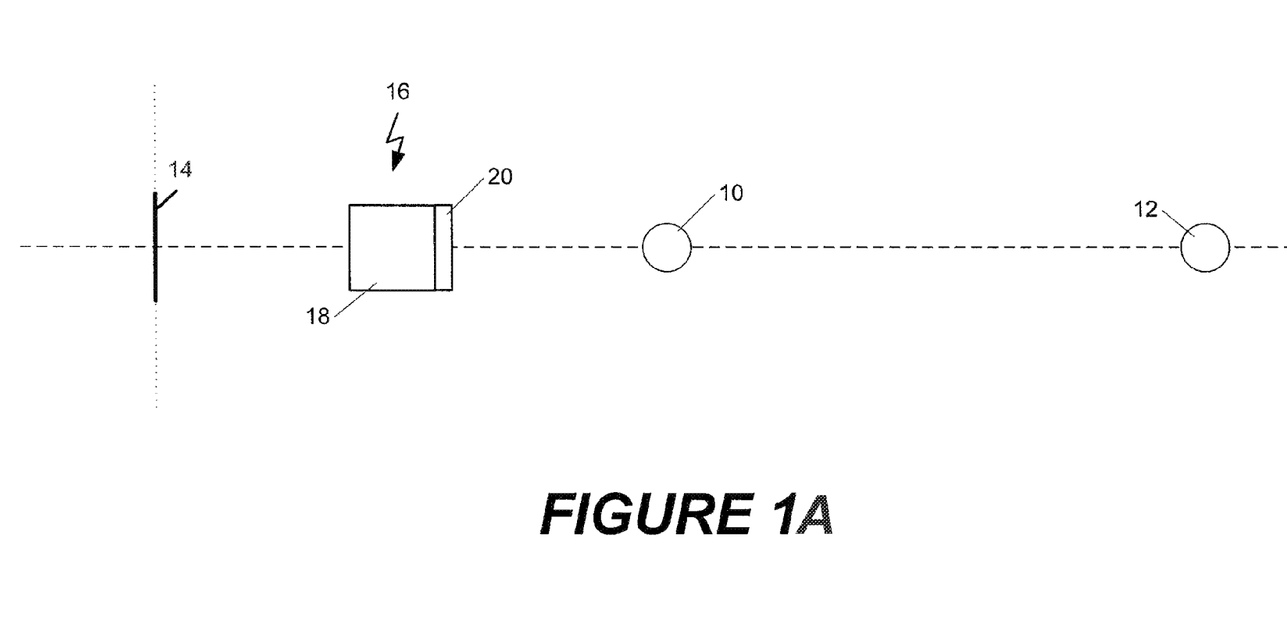
FIG. 1A is a schematic view of a general arrangement for an imaging system using a tunable liquid crystal lens.
Figure 1B:
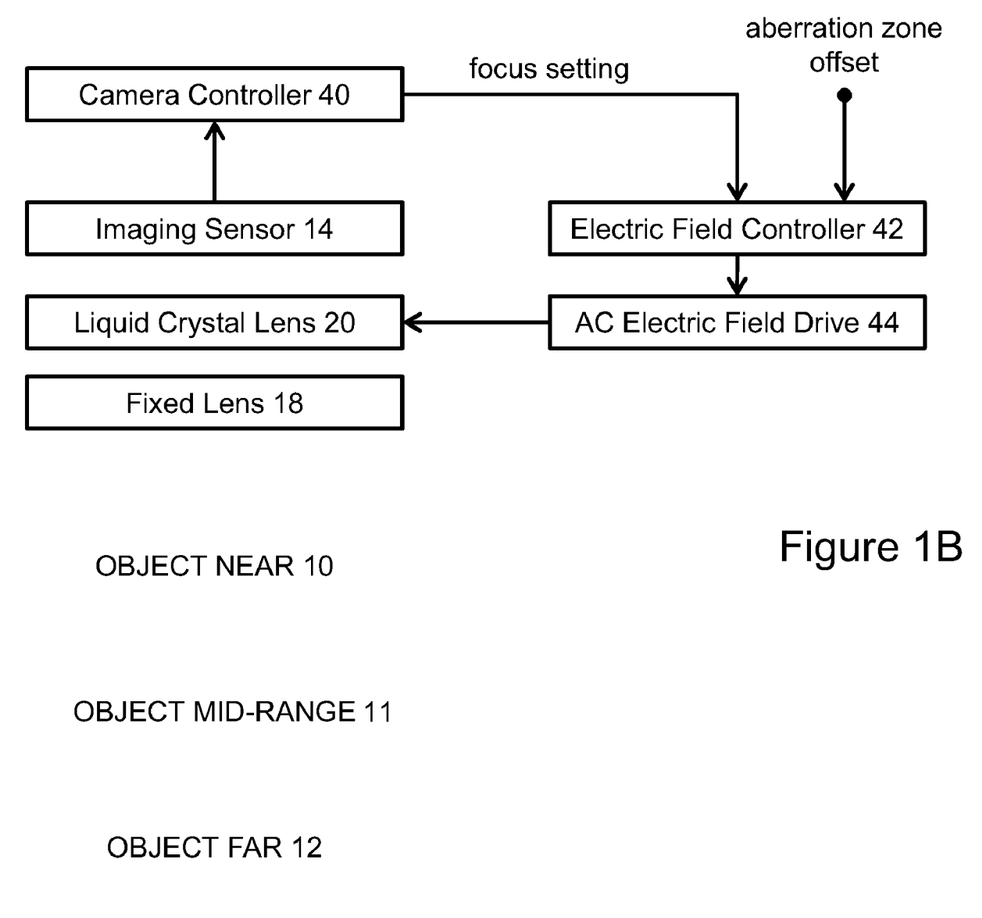
FIG. 1B is a schematic view of a camera system having an electric field controller with an aberration zone offset.

FIGS. 1A and 1B depict schematically a tunable imaging system using a tunable lens 16. Two or three objects to be imaged are shown in the figures, a "near" object 10 and a "far" object 12, in addition to a "mid-range" object 11. A two-dimensional image sensor (e.g., a photodetector) 14 is positioned at a fixed plane so as to capture the image formed by (combined) tunable lens 16. The tunable lens 16 includes a fixed lens assembly 18 and a tunable liquid crystal (LC) lens 20. For a mobile telephone or laptop computer application, the assembly may be quite compact with the image sensor 14 and the tunable liquid crystal lens 20 and fixed lens assembly 18 being about 5 millimeters thick. The LC lens 20 is voltage-controlled and, in response to voltage changes which alter the electric field across the LC structure, the refractive index of the LC lens 20 changes.

A camera controller 40 sets a desired focus value, and an electric field controller 42 determines a suitable control voltage value corresponding to the focus value. The controller 42 is configured in conjunction with an offset that can be a variable input as illustrated, or defined by static (also known as "hardwired") values used in establishing a conversion function or look-up table for translating focus values into electric field values. As will be understood in better detail hereinbelow, this offset is chosen based on an understanding of one or more optical properties of the lens (or other device, such as an optical beam steering device) as they vary with applied voltage.

The voltage level signal determined by controller 42 is fed to a variable voltage drive circuit 44 (for example an AC electric field drive circuit) that is connected to the transparent electrodes of the liquid crystal lens layer. Depending on the applied AC voltage, the LC lens 20, in combination with the fixed lens assembly 18, forms an image of an object within the field of the lens at the plane of the imaging sensor 14. Thus, at a first voltage, an image of the near-field object 10 is formed at the plane of the imaging sensor 14 while, at a second voltage, an image of the far-field object 12 is formed at the imaging sensor plane.

Figure 2:
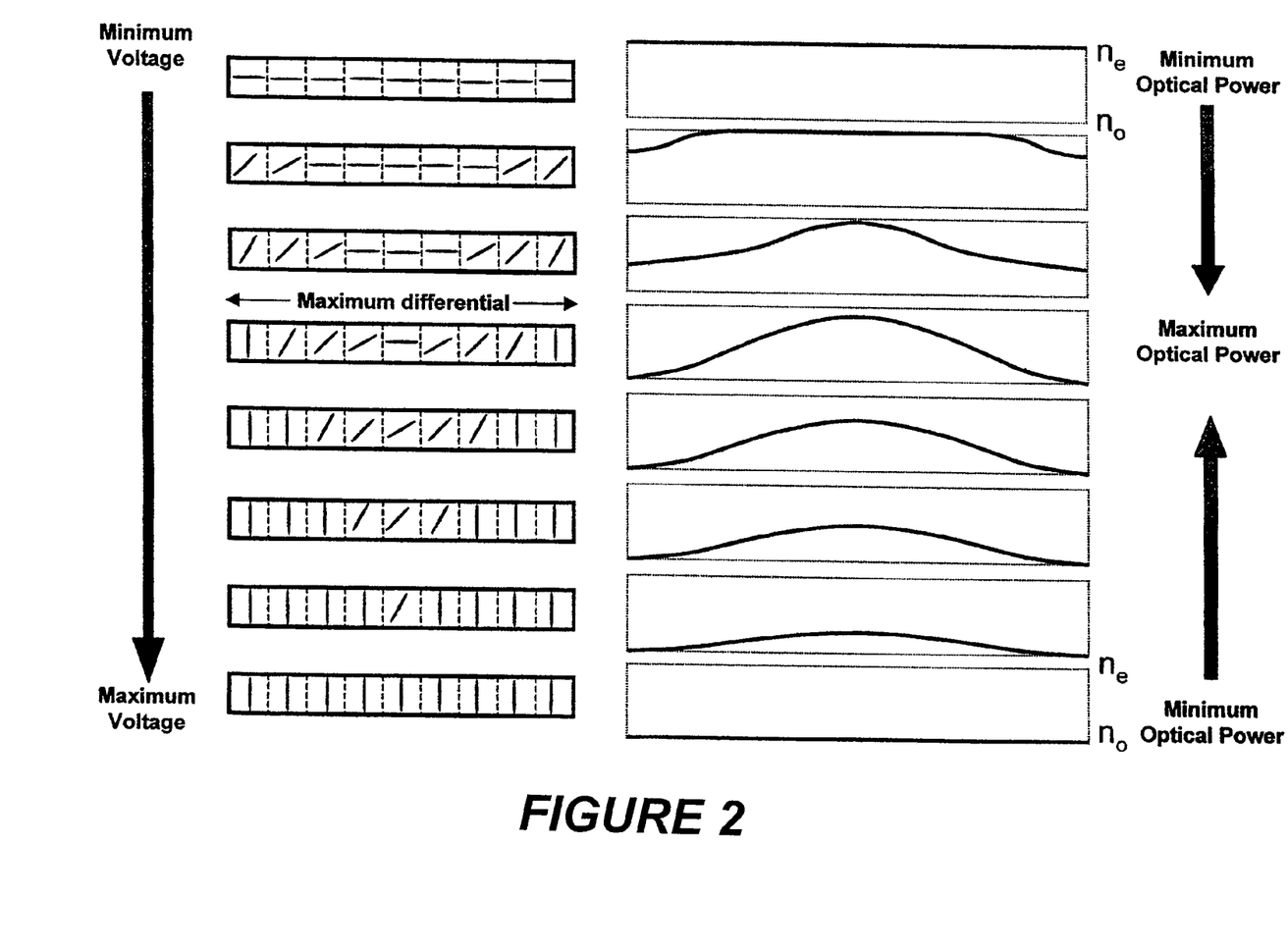
FIG. 2 is a schematic view that illustrates a change in liquid crystal molecular orientation as a function of voltage leading to a corresponding change in optical power.

While LC lenses provide a compact, non-mechanical means of changing the focal length of a tunable lens, they may suffer from aberration at certain applied voltage levels. This is due to an inability to completely control the full range of liquid crystal orientations so as to maintain a desired refractive index profile. FIG. 2 is a schematic depiction showing the effect of electric field variation on the orientation of liquid crystal molecules within the liquid crystal lens. Those skilled in the art will recognize that the figure is not precise, and serves only to facilitate description of the relevant aspects of a voltage-controlled lens of this nature.

As shown in FIG. 2, at a minimum voltage, all molecules of the crystal are in a common orientation. This orientation and any pre-tilt is determined at the layer surfaces by the rubbing of the liquid crystal cell walls or plates. In the middle of the layer, thermal excitation may cause some random orientation of the liquid crystal molecules. In this state, the refractive index is constant across the surface of the LC, and there is no lens effect. Along the right side of the figure is an indication of the relative optical power for different crystal states. At the minimum voltage, e-polarized light encounters a common refractive index $n_e$ across the entire crystal surface, and the optical power is minimal. In this state, the tunable lens (which includes a fixed lens assembly) may be configured to properly image the objects located in the far field. However, as the voltage increases, the corresponding electric field causes a spatially variable change in the molecular orientation of certain portions of the crystal. This spatially variable change in orientation is accompanied by a spatially varying index of refraction, and a resulting shift in the focal point of the lens. As the voltage continues to increase, the crystal eventually reaches a state of maximum optical power, in which the images of near objects are brought into focus. However, as the voltage increases further, a change in the orientation of liquid crystal molecules results in a decrease in the optical power of the lens, as the refractive index no begins to dominate. Eventually, as the voltage continues to rise, the lens effect is lost entirely, as the whole image-forming portion reaches a full change in orientation with resulting spatial uniformity of index of refraction.

Figure 3A:
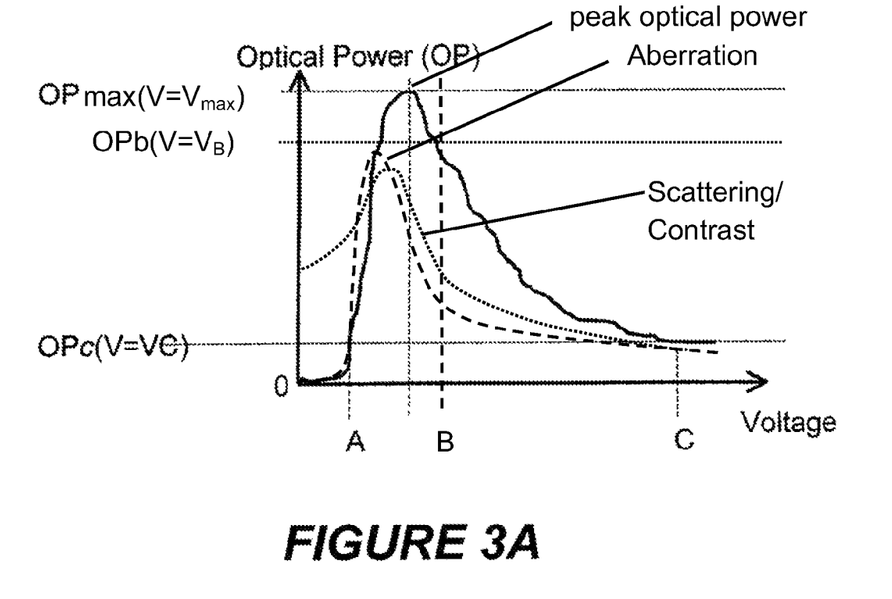
FIG. 3A is a graphical depiction of the change in optical power with voltage for a liquid crystal lens having a positive tunability.

A limitation of a lens such as is represented by FIGS. 1A, 1B and 2 is that an inability to precisely control a change in orientation of the LC molecules across the entire voltage range results in distortions in the shape of the effective lens. These distortions manifest themselves in the form of aberrations in the images produced by the lens, as well as in the form of cloudiness or scattering of light by the liquid crystal layer. Shown in FIG. 3a is a graphical representation of how the optical power of an LC lens of this type changes with changing input voltage. As shown, the lens has zero optical power at 0V and, as the voltage is increased, the optical power increases to a maximum value of $OP_{max}$ at voltage $V_{max}$. As the voltage is further increased, the optical power decreases, and reaches a value of $OP_C$ at voltage $V_C$.

For the LC lens, the range of aberrational lens states, also referred to as a "fuzzy zone," is such that the resulting images contain an unacceptable higher degree of aberration than for other ranges. For an LC lens as depicted in FIG. 3A, lens states between voltage $V_A$ and voltage $V_B$ are prone to aberrations. The range from $V_B$, which corresponds to at least 5%, and about 10% to 20% below maximum optical power, to $V_C$ provides less aberration and a much more accurate distribution of refractive index, and the resulting images are significantly more accurate. As shown in FIG. 3A using an arbitrary scale for the sake of illustration, aberration due to non-linearity of index of refraction starts at 0 at voltage V=0, and peaks prior to the optical power peak. However, for the liquid crystal layers tested made from zero or low pre-tilt angle surface walls, the aberration was still moderately high at peak optical power. In some imaging applications, this level of aberration may not be suitable. However, the level of such aberration drops significantly with a modest increase in voltage, and thus with a modest sacrifice in the tunable range, the lens 20 operates with much lower aberration over its range of operation.

Also taken into account in determining the offset is the scattering of light due to the liquid crystal layer. Scattering starts at low voltage at a higher value, peaks at higher electric field and drops at higher voltages to a value lower than the start value. In the case of the liquid crystal lenses tested, the peak was just before the optical power peak, but the residual scattering at peak optical power was still higher than the initial low voltage level. The scattering can be observed as a slight cloudiness in thicker layers, although in a thin layer is difficult to perceive with the naked eye.

As can be appreciated, the voltage at which aberration and scattering are diminished sufficiently is a complex consideration of the application of the lens. The requirements for optical quality, and the physical properties of the liquid crystal molecules and the pre-tilt of the rubbed walls of the liquid crystal assembly, among other things, affect this determination.

In one embodiment, the fixed lens 18 is part of an assembly that provides an image sensor mounting to hold the image sensor 14 at a desired position so that a far field or infinity image is in focus on the image sensor when the only imaging optics is the fixed lens 18. Such an assembly can be a commercially available camera lens assembly. The tunable liquid crystal lens 20 operates as in FIG. 3A, namely far field focus is at $V_C$ close focus is at $V_B$, and an optical power adjustment element is provided to allow the image sensor to receive an in-focus image at $V_C$ of the far field in spite of the small optical power of the liquid crystal lens at $V_C$. The optical power adjustment can be provided either by placing a spacer to move the image sensor with respect to the assembly, or by including an additional optical power, or a combination of both. The additional optical power can be integrated into the liquid crystal lens, or it can be separate.

In this embodiment, an autofocus module of the camera controller 40 begins at $V_B$ and sweeps voltage quickly to $V_C$ while the image sensor is read for its image to determine at which voltage the image is in focus. The choice to sweep from lower to higher voltage allows for a faster liquid crystal lens response. The aberration and scatter of the liquid crystal lens are also lower at $V_C$ than at $V_B$ and this is preferred for a better quality far field image. In fact, it may be acceptable in terms of aberration and scatter to use $V_B$ at a value that coincides with peak optical power without sacrificing some of the tunable optical power range.

As will be noted by those skilled in the art, the graph of FIG. 3A depicts a lens having "positive tunability," that is, the optical power of the lens initially increases with increasing voltage. It is also possible to have an LC lens for which the optical power initially decreases as the voltage level is increased. A lens such as this is referred to as having "negative tunability," and may have a characteristic as shown graphically in FIG. 3B. As shown, the optical power is zero at 0V and, as the voltage is increased, it decreases to a value of $-OP_A$ at a voltage $V_A$. As the voltage is increased to $V_{max}$, the optical power decreases further to a value of $-OP_{max}$. This is the maximum optical power difference and the minimum value for the lens and, as the voltage is increased even further, the optical power increases, reaching a value of $-OP_C$ at a voltage value of $V_C$. As with the lens having positive tunability, the negative tunability lens has strong aberrations, i.e., a fuzzy zone, between the voltage values of $V_A$ and $V_B$, and has much better optical qualities in the range of $V_B$ to $V_C$. Each of these types of LC lens, positive tunability or negative tunability, may be desirable for a given application, and the invention may make use of either type.

For imaging applications, such as in a compact digital camera as might be found on a cellular telephone, a certain amount of aberration may be tolerated. However, as the distortion of the optical profile increases, the aberration due to the fuzzy zones becomes so severe that the resulting images are unacceptable. Although the tolerance for aberration may vary from one application to another, a root mean square (RMS) aberration of less than 0.5 μm is one commonly recognized limit.

Figure 4A:
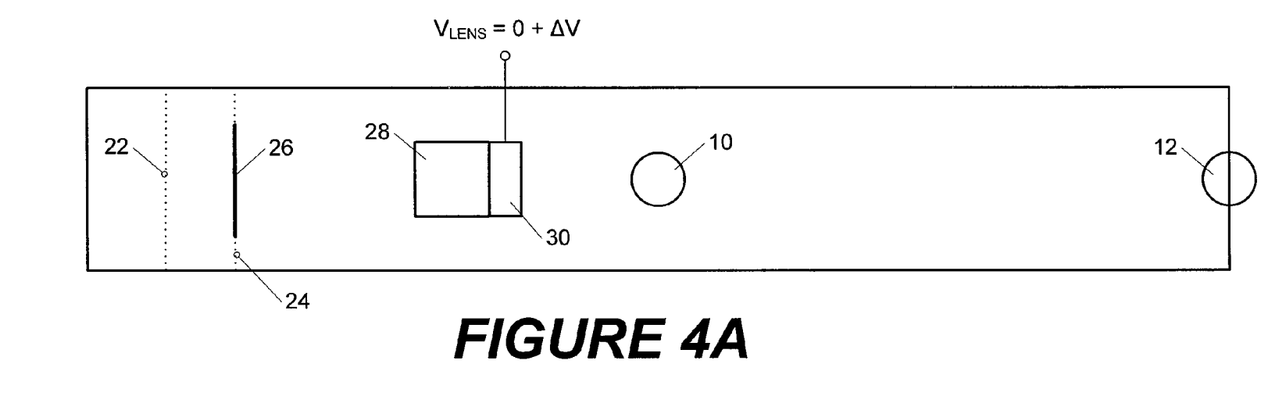
FIG. 4A is a schematic view of a liquid crystal lens imaging system with positive tunability that has a "fuzzy zone" within a certain range of the lens optical power.

In a conventional tunable lens, the lens is arranged to provide a maximum degree of optical power. Typically, the useful range of small lenses is on the order of twelve diopters. Due to the fuzzy zones, however, the application must tolerate aberration at certain voltage levels for the tunable lens. FIG. 4A is a schematic view showing the arrangement of a tunable lens having "positive tunability," (e.g., from 0 to 12 diopters). The lens includes an LC lens 30 and a fixed lens 28. For imaging, a photodetector 26 is located at position 24 that, at zero optical power of the LC lens 30, would correspond to an image plane for a very distant field (e.g., infinity). At zero optical power of the LC lens 30, the image plane for the far field object 12 is at position 24, and the image plane for the near field object 10 is at position 22. As the voltage on the LC lens is increased to $V_B$, the image plane for the near field is shifted to position 24, thereby allowing the image to be detected by the photodetector 26. Thus, the full range of the apparatus is provided based on the voltage range applied to the LC lens of $V_{LENS}=0+\Delta V$. However, while covering a full range of optical power of the LC lens, this configuration suffers from optical power levels for which there is a high degree of aberration in the image due to the fuzzy zone.

For the simple generation of images, certain areas outside of the fuzzy zones produce acceptable images, but the other areas, with high aberration, are unacceptable. Moreover, for certain applications, such as the "autofocusing" function of a camera, the fuzzy zone creates problems. Such autofocusing functions, as may be performed in controller 40, typically rely on an algorithm to discern from a formed image the direction in which the lens must be adjusted in order to form an accurate image. The aberrations in the fuzzy zone can confuse the algorithm, therefore limiting the autofocus function. This may significantly slow the focusing of the camera, or render it inoperable altogether.

In the present invention, a voltage range is applied to the LC lens that limits the operating region to a portion of the optical power/voltage curve outside of the fuzzy zone regions. In particular, the present invention makes use of the region between point B and point C on the characteristics shown in FIGS. 3A and 3B. As can be seen, this limits the optical power range of the LC lens, but avoids the fuzzy zone problem.

Figure 4B:
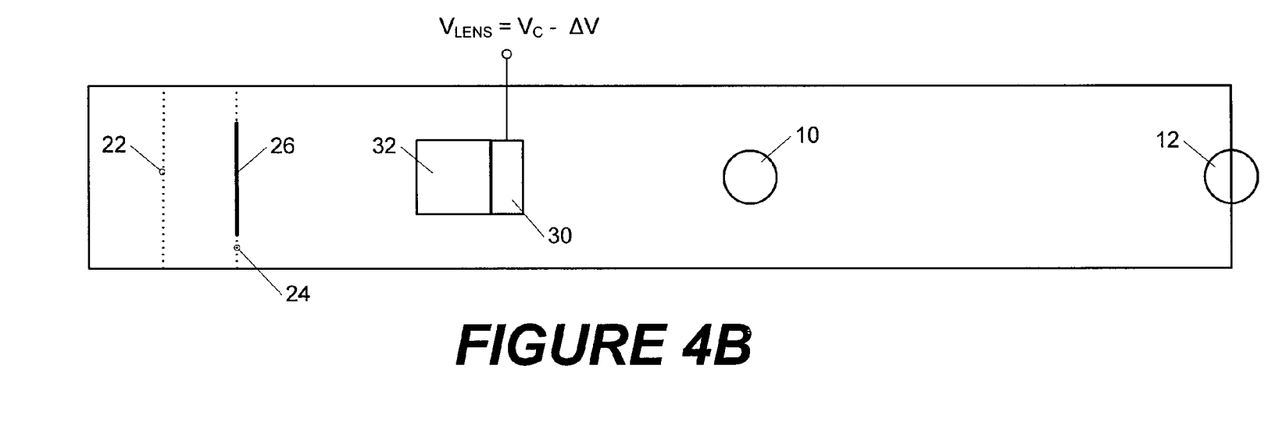
FIG. 4B is a schematic view of an embodiment of the invention in which the relative lens powers of the fixed lens and tunable lens, and the selection of the voltage range applied to the tunable lens provide an imaging system with positive tunability and no fuzzy zone.

In a first embodiment of the present invention, an additional amount of fixed lens optical power is used together with a particular voltage range to eliminate the fuzzy zone while retaining the proper image-forming characteristics relative to a conventional system. In the embodiment of FIG. 4B, the LC lens 30 is like that of the FIG. 4A configuration, i.e., it has a positive tunability characteristic as shown in FIG. 3A. The fixed lens portion 32 in FIG. 4B is also like the fixed lens portion 28 of the FIG. 4A arrangement, but it has a lens power that differs by $-OP_C$ relative to that of the lens 28. Control of the FIG. 4B LC lens 30 differs also, in that it is driven from voltage $V_C$ down to voltage $V_B$. That is, the lens voltage is $V_{LENS}=V_C-\Delta V$, where the range of $\Delta V$ is from 0 to $(V_C-V_B)$. This ensures that as the voltage $V_{LENS}$ is varied, the optical power of the overall lens increases.

The difference in lens power of the fixed lens 32 (relative to that of the system shown in FIG. 4A) offsets the minimum optical power provided by the LC lens of FIG. 4B. Thus, the minimum optical power of the FIG. 4B embodiment will be the same as that shown in FIG. 4A. However, those skilled in the art will recognize that this comparison is intended to show the difference from a system like that of FIG. 4A, and that the appropriate overall optical power range will depend on a specific application. That is, a fixed lens power is selected together with the LC lens to create a system that will provide the appropriate lens power for the desired application. Thus, if the system of FIG. 4B was to have the same photodetector positioning as that of FIG. 4A, and the same minimum optical power, the fixed lens 32 of FIG. 4B would have an optical power that differs from the optical power of the fixed lens 28 of FIG. 4A by $OP_C$. This amount would compensate for the initial optical power of the LC lens, $OP_C$, that results from the particular voltage range of the LC lens of FIG. 4B. Of course, the embodiment of FIG. 4B will have a smaller range of optical power variation as compared to the lens configuration of FIG. 4A, but it will have a continuous variable range free of any serious aberrations.

Figure 4C:
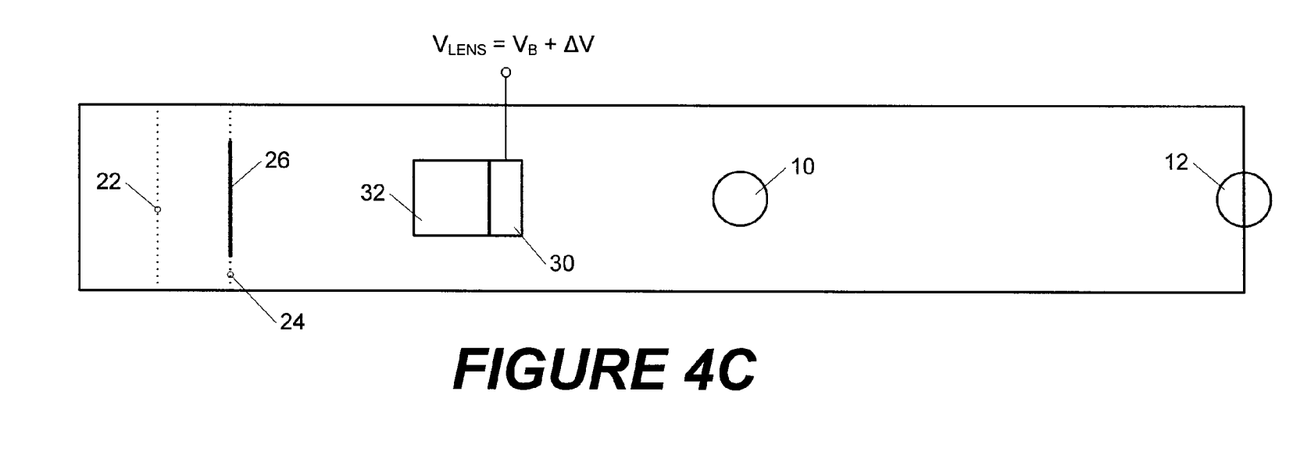
FIG. 4C is a schematic view of an embodiment of the invention in which the relative lens power of the fixed lens and tunable lens, and the selection of the voltage range applied to the tunable lens provide an imaging system with negative tunability and no fuzzy zone.

It may also be desirable to have a variable imaging system for which a variable lens decreases in optical power as voltage is increased. An embodiment for doing this is shown in FIG. 4C. The configuration of the system in FIG. 4C is identical to that in FIG. 4B, except that the voltage $V_{LENS}=V_B+\Delta V$, and the value of $\Delta V$ is varied from 0 to $(V_C-V_B)$ so that, as the voltage is increased on the tunable lens, the optical power is lowered from $OP_B$ to $OP_C$.

Figure 4D:
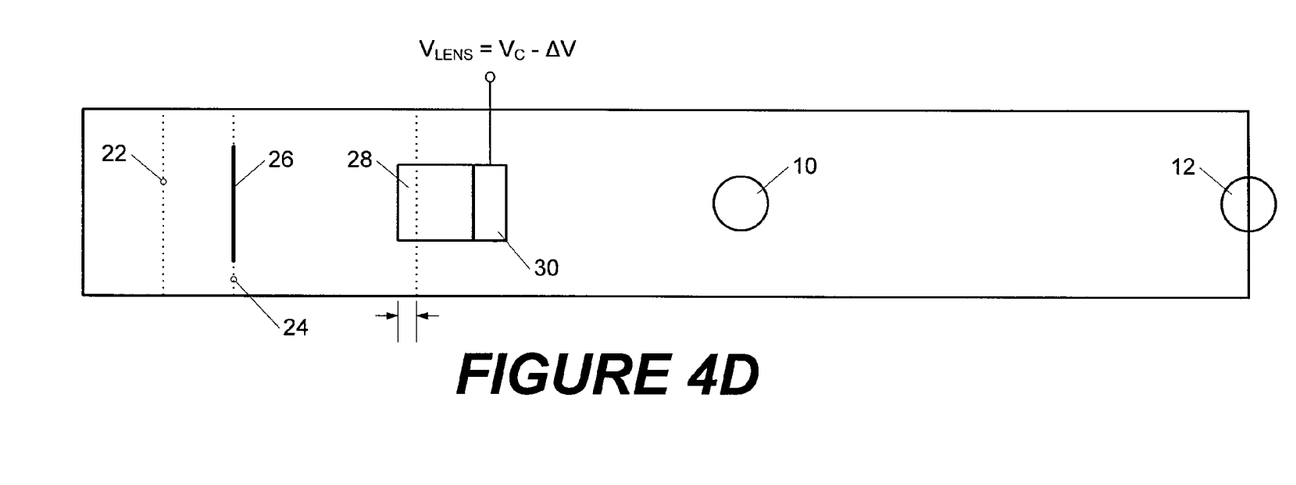
FIG. 4D is a schematic view demonstrating an embodiment in which the relative positioning of the photodetector and lens assembly may also be used, together with the relative lens power of the fixed lens and tunable lens and the selection of the voltage range applied to the tunable lens, to provide an imaging system according to the present invention.

Shown in FIG. 4D is an embodiment in which the fixed lens is like that shown in FIG. 4A. In this embodiment, the tunable lens is also limited to the range between $V_B$ and $V_C$, but compensation for the baseline optical power ($OP_C$) that it generates in this range is provided by a shift in the positioning of the lens assembly. The lens assembly in FIG. 4D comprises fixed lens portion 28 and LC lens 30, but it is positioned closer to the photodetector 26 than the lens of the embodiment of FIG. 4B. As the lens assembly must image the near and far objects at the photodetector plane, the movement of the lens assembly closer to this plane compensates for the minimum optical power contributed by the LC lens (i.e., $OP_C$). That is, rather than compensating for the minimum optical power in the LC lens with a net lower optical power in the fixed lens, as in FIG. 4B, the relative positioning between the lens assembly and the photodetector is selected to insure imaging of an object at a desired distance from the lens assembly when $V_{LENS}$ is at a minimum. As in earlier embodiments, those skilled in the art will understand that it is the overall arrangement of the lens assembly and the photodetector along with the application of selected voltages that produces the desired range of imaging, and that the use of the term "compensation" herein is for the purpose of explaining how the present invention differs from a more conventional approach. As with the other embodiments, the embodiment of FIG. 4D will also have a reduced range due to the necessary minimum optical power of the LC lens 30, but it will operate across a range for which there is no serious aberration.

Figure 3B:
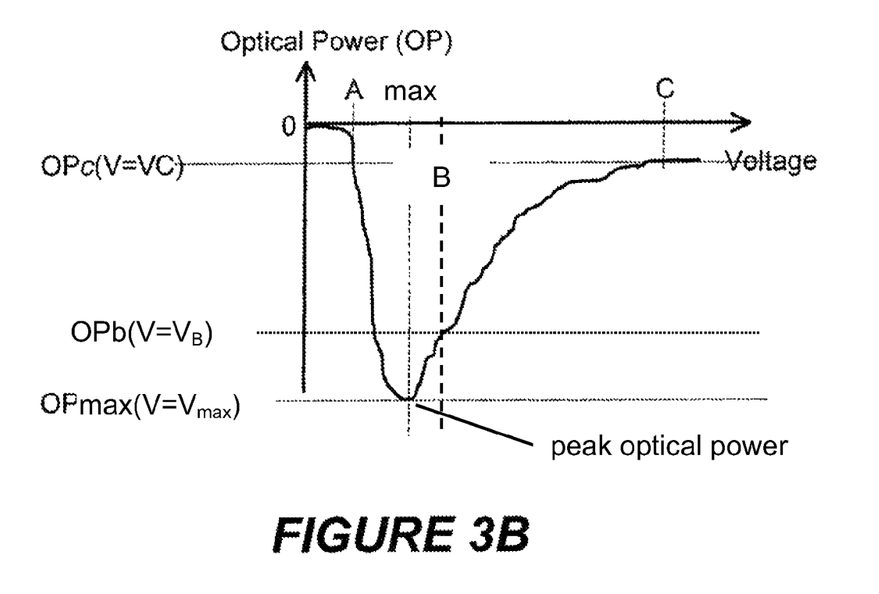
FIG. 3B is a graphical depiction of the change in optical power with voltage for a liquid crystal lens having a negative tunability.

The present invention may also make use of an LC lens having negative tunability, such as that shown in FIG. 3B. In such a case, the LC lens provides a negative optical power that supplements the optical power of the fixed lens. As discussed above, a tunable LC lens with "positive tunability" may be used to vary the total optical power of the lens assembly from a lower value to a higher value (by operating it from higher voltage $V_C$ to lower voltage $V_B$), or from a higher value to a lower value (by operating it from lower voltage $V_B$ to higher voltage $V_C$). Likewise, the negative tunability LC lens may be used to vary the overall optical power in either increasing or decreasing manner. However, because the negative tunability LC lens has an optical power that is lower at the lower voltage $V_B$ than at the higher voltage $V_C$, there may be an advantage in power requirements to the use of this type of LC lens. Thus, for example, if the LC lens 30 of FIG. 4B is a negative tunability type lens, the changing of the voltage on the lens from $V_C$ to $V_B$ would result in a net decrease in the overall optical power of the lens assembly. Similarly, if the LC lens 30 of FIG. 4C is a negative tunability type lens, the changing of the voltage on the lens from $V_B$ to $V_C$ would result in a net increase in the overall optical power of the lens assembly.

The selection of an LC lens with positive tunability or negative tunability may depend on the desired application and the corresponding power consumption criteria. For example, if it is desired for a particular application to minimize the voltage levels provided to the LC lens, and it is expected that the higher optical powers will be used more often than lower optical powers, a positive tunability lens may be chosen for that application. Similarly, if it is expected that lower optical powers will be used more often than higher optical powers, a negative tunability lens might minimize the need for higher voltages. Those skilled in the art will understand that the different design options provided by the present invention may be mixed and matched as desired.

While the invention has been shown and described with reference to certain embodiments thereof, it will be understood by those skilled in the art that various changes in form and detail may be made therein without departing from the spirit and scope of the invention as defined by the appended claims. In particular, various material compositions, various LC layers, various electrodes, various director alignments, various geometrical forms, etc. may be used with the present invention. It will also be recognized that various optical devices can be developed using one or more combinations of the embodiments described above.

What is claimed is:

1. An imaging device comprising:
   an image sensor;
   a fixed lens assembly having at least one fixed optical power lens and a mounting for said image sensor at which a far field is in focus on said image sensor;
   a tunable liquid crystal lens mounted in an optical path of said image sensor and said fixed lens assembly, said tunable liquid crystal lens having an optical power controlled by one of an electric field and a magnetic field each having a field level, said optical power increases from zero field level to a maximum power at a second field level, and decreases from said second field level to a non-zero end optical power at a maximum field level; and an optical power adjustment element comprising at least one of a spacer and an additional lens, wherein said optical power adjustment element cancels said non-zero optical power so that said image sensor receives a far field image at said maximum field level.

2. The imaging device according to claim 1, wherein an initial optical power at zero field level is zero.

3. The imaging device according to claim 2, wherein said tunable liquid crystal lens comprises a flat liquid crystal layer and an electric field source providing a variable, spatially non-uniform electric field across the liquid crystal layer to provide a tunable range of optical power.

4. The imaging device according to claim 3, wherein said electric field source provides said additional lens.

5. The imaging device according to claim 1, wherein said source comprises an electric field controller setting an electric field control signal in response to an optical power value signal, said electric field controller having an offset value restricting said tunable range to reduce an effect of at least one of aberration or scattering caused by said liquid crystal layer under conditions of lower or moderate electric fields.

6. The imaging device according to claim 5, further comprising an autofocus module that signals said controller to sweep said control signal from close focus near said second field level to far field focus near at said maximum focus until a focus position is found.

7. An imaging device comprising:
an image sensor;
a liquid crystal layer;
an electric field source providing a variable, spatially non-uniform electric field across the liquid crystal layer to provide a tunable range of optical power, wherein said layer, under the effect of said electric field, forms a tunable liquid crystal lens having a variable optical power that changes in a first direction with an increase in the strength of the electric field from an initial optical power to a peak optical power, and which changes in a second direction with a further increase of the strength of the electric field from said peak optical power to a non-zero end optical power different from the initial optical power, and wherein operation of the liquid crystal layer is limited to a continuous, non-zero tunable operational optical power range between the peak optical power and the end optical power; and
one or more fixed lenses cooperating with said liquid crystal lens at non-zero optical power to focus an image onto said image sensor with an infinity focus near one limit of said tunable range.

8. The imaging device according to claim 7, wherein said operational optical power range begins after a significant drop in optical aberration.

9. The imaging device according to claim 7, wherein said operational optical power range begins after a significant drop in optical scattering.

10. The imaging device according to claim 9, wherein said beginning of said optical power range corresponds to an optical power of said layer that is, in absolute measurement, at least 10% less than said peak optical power when measured with respect to said initial optical power.

11. The imaging device according to claim 7, wherein said operational optical power range begins after a significant drop in both optical aberration and optical scattering.

12. The imaging device according to claim 7, wherein said liquid crystal layer is flat.

13. The imaging device according to claim 1, wherein said beginning of said optical power range corresponds to an optical power of said layer that is, in absolute measurement, at least 5% less than said peak optical power when measured with respect to said initial optical power.

14. A method of controlling a tunable optical device having a liquid crystal layer and a variable, spatially non-uniform electric field applied across the liquid crystal layer to provide a tunable range of an optical property, the method comprising:

detecting at least one of aberration and scattering caused by said liquid crystal layer under conditions of relatively low electric fields and determining a corresponding optical quality of said device as a function of electric field;

determining a preferred range of operation for said electric field that avoids a range at which said optical quality is less desirable; and generating said electric field in accordance with an optical power value for said device within said preferred range of operation.

15. The method according to claim 14, wherein said device is a lens, said layer has a zero optical power at zero electric field, and said preferred range is at an electric field level above peak optical power and ending at a non-zero optical power at a desired-maximum electric field.

16. The method according to claim 15, wherein said range is chosen such that an absolute upper limit optical power of said suitable range is at least 5% less than said peak optical power.

17. The method according to claim 15, wherein said range is chosen such that an absolute upper limit optical power of said suitable range is at least 10% less than said peak optical power.

18. The method according to claim 15, wherein said range is chosen taking into consideration optical aberration due to non-linearity in liquid crystal response to field level.

19. The method according to claim 15, wherein said range is chosen taking into consideration optical scattering.

20. The method according to claim 15, wherein said range is chosen taking into consideration optical scattering and optical aberration due to non-linearity in liquid crystal response to field level.

21. A tunable optical device having a liquid crystal layer and a variable, spatially non-uniform electric field applied across the liquid crystal layer to provide a tunable range of an optical property, said device having an electric field controller setting an electric field control signal in response to a optical value signal, said electric field controller having an offset value restricting a range of operation of said tunable range to reduce an effect of at least one of aberration and scattering caused by said liquid crystal layer under conditions of relatively low electric fields.

22. The tunable optical device according to claim 21, wherein said range begins after a significant drop in optical aberration.

23. The tunable optical device according to claim 21, wherein said range begins after a significant drop in optical scattering.

24. The tunable optical device according to claim 21, wherein said range begins after a significant drop in both optical aberration and optical scattering.

* * * * *